United States Patent
Dowdall et al.

(10) Patent No.: US 9,086,481 B1
(45) Date of Patent: Jul. 21, 2015

(54) METHODS AND SYSTEMS FOR ESTIMATING VEHICLE SPEED

(71) Applicants: Jonathan Baldwin Dowdall, Oakland, CA (US); Jiajun Zhu, Sunnyvale, CA (US)

(72) Inventors: Jonathan Baldwin Dowdall, Oakland, CA (US); Jiajun Zhu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 141 days.

(21) Appl. No.: 13/745,383

(22) Filed: Jan. 18, 2013

(51) Int. Cl.
*G01S 17/58* (2006.01)
*G01C 3/08* (2006.01)

(52) U.S. Cl.
CPC .. *G01S 17/58* (2013.01); *G01C 3/08* (2013.01)

(58) Field of Classification Search
CPC .................................. G01S 17/66; G01S 17/87
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 8,050,863 B2 | 11/2011 | Trepagnier et al. | |
| 2010/0198491 A1 | 8/2010 | Mays | |
| 2011/0026008 A1* | 2/2011 | Gammenthaler | 356/28 |
| 2011/0037970 A1* | 2/2011 | Rogers et al. | 356/28 |
| 2012/0271539 A1 | 10/2012 | Bald et al. | |
| 2013/0242284 A1* | 9/2013 | Zeng | 356/4.01 |

FOREIGN PATENT DOCUMENTS

WO 2006047297 5/2006

* cited by examiner

*Primary Examiner* — Luke Ratcliffe
(74) *Attorney, Agent, or Firm* — McDonnell Boehnen Hulbert & Berghoff LLP

(57) ABSTRACT

Methods and systems for estimating vehicle speed are disclosed. A light detecting and ranging (LIDAR) device obtains a set of spatial points indicative of locations of reflective surfaces in an environment of the LIDAR device. A plurality of target points that correspond to a target surface of a target vehicle is identified in the set of spatial points. The plurality of target points includes a first point indicative of a first location on the target surface obtained by the LIDAR device at a first time and a second point indicative of a second location on the target surface obtained by the LIDAR device at a second time. A speed of the target vehicle is estimated based on the first location, the first time, the second location, and the second time.

17 Claims, 11 Drawing Sheets

METHODS AND SYSTEMS FOR ESTIMATING VEHICLE SPEED

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the vehicle's directional controls to cause the vehicle to navigate around the obstacle.

One such sensor is a light detection and ranging (LIDAR) device. A LIDAR device actively estimates distances to environmental features while scanning through a scene to assemble a cloud of point positions indicative of the three-dimensional shape of the environmental scene. Individual points are measured by generating a laser pulse and detecting a returning pulse, if any, reflected from an environmental object, and determining the distance to the reflective object according to the time delay between the emitted pulse and the reception of the reflected pulse. The laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. A three-dimensional map of points of reflective features is generated based on the returning pulses for the entire scanning zone. The three-dimensional point map thereby indicates positions of reflective objects in the scanned scene.

SUMMARY

Methods and systems for estimating vehicle speed are disclosed herein. In some embodiments of the present disclosure, a method involves receiving a set of spatial points obtained using a LIDAR device associated with a vehicle. The spatial points are indicative of locations of reflective surfaces in an environment of the vehicle. The method can involve identifying in the set of spatial points a plurality of target points that correspond to a target surface of a target vehicle. The target surface is a front surface or rear surface of a target vehicle. The method can involve identifying, in the set of spatial points, a first point indicative of a first location on the target surface. The first point was obtained by the LIDAR device at a first time. The method can involve identifying, in the set of spatial points, a second point indicative of a second location on the target surface. The second point was obtained by the LIDAR device at a second time. The method can involve determining an offset between the first location and the second location. The method can involve determining a time difference between the first time and the second time. And the method can involve determining, by a computing device, an estimate of a speed of the target vehicle based on the offset divided by the time difference.

In some embodiments of the present disclosure, a system is disclosed. The system can include a LIDAR device, a processing unit, non-transitory data storage, and program instructions stored in the non-transitory data storage and executable by the processing unit to carry out functions comprising: receiving a set of spatial points obtained using the LIDAR device; identifying in the set of spatial points a plurality of target points that correspond to a target surface of a target vehicle; identifying, in the plurality of target points, a first point indicative of a first location on the target surface, wherein the first point was obtained by the LIDAR at first time; identifying, in the plurality of target points, a second point indicative of a second location on the target surface, wherein the second point was obtained by the LIDAR at a second time; determining an offset between the first location and the second location; determining a time difference between the first time and the second time; and determining an estimate of a speed of the target vehicle based on the offset divided by the time difference.

In some embodiments of the present disclosure, a non-transitory computer-readable medium having program instructions stored therein is disclosed. The non-transitory computer-readable medium stores program instructions that, when executed by a computing device, cause the computing device to perform functions comprising: receiving a set of spatial points obtained using the LIDAR device; identifying in the set of spatial points a plurality of target points that correspond to a target surface of a target vehicle; identifying, in the plurality of target points, a first point indicative of a first location on the target surface, wherein the first point was obtained by the LIDAR at first time; identifying, in the plurality of target points, a second point indicative of a second location on the target surface, wherein the second point was obtained by the LIDAR at a second time; determining an offset between the first location and the second location; determining a time difference between the first time and the second time; and determining an estimate of a speed of the target vehicle based on the offset divided by the time difference.

These as well as other aspects, advantages, and alternatives, will become apparent to those of ordinary skill in the art by reading the following detailed description, with reference where appropriate to the accompanying drawings.

DETAILED DESCRIPTION

Example embodiments relate to an autonomous vehicle, such as a driverless automobile, that includes a LIDAR sensor for actively detecting reflective features in the environment surrounding the vehicle. A controller analyzes information from the LIDAR sensor to identify the surroundings of the vehicle and determines how to direct the propulsion systems of the vehicle to effect a navigation path that substantially avoids obstacles indicated by the information from the LIDAR sensor.

Some aspects of the example methods described herein may be carried out in whole or in part by an autonomous vehicle or components thereof. However, some example methods may also be carried out in whole or in part by a system or systems that are remote from an autonomous vehicle. For instance, an example method could be carried out in part or in full by a server system, which receives information from sensors (e.g., raw sensor data and/or information derived therefrom) of an autonomous vehicle. Other examples are also possible.

Example systems within the scope of the present disclosure will now be described in greater detail. An example system may be implemented in, or may take the form of, an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

Figure 1:
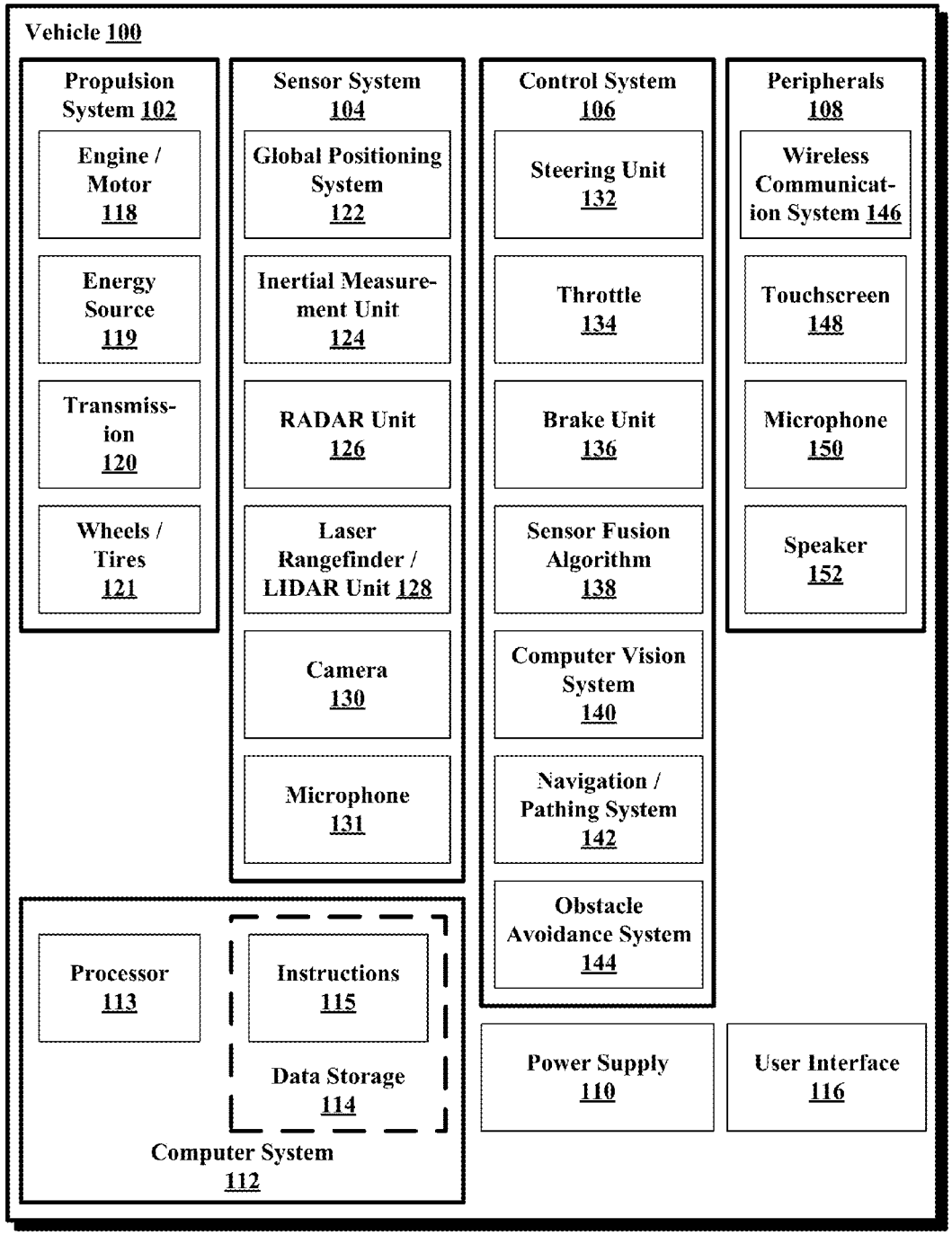
FIG. 1 is a functional block diagram depicting a vehicle according to an example embodiment.

FIG. 1 is a functional block diagram depicting a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from a sensor system 104, and base one or more control processes (such as the setting a heading so as to avoid a detected obstacle) upon the received information in an automated fashion.

The vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, the sensor system 104, the control system 106, one or more peripherals 108, a power supply 110, the computer system 112, and a user interface 116. The vehicle 100 may include more or fewer subsystems and each subsystem can optionally include multiple components. Further, each of the subsystems and components of the vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments the propulsion system 102 includes an engine/motor 118, an energy source 119, a transmission 120, and wheels/tires 121. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission 120. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires 121 can be arranged as a unicycle, bicycle, motorcycle, tricycle, or car/truck four-wheel format. Other wheel/tire geometries of the wheels/tires 121 are possible, such as those including six or more wheels. Any combination of the wheels/tires 121 of the vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a RADAR unit 126, a laser rangefinder/LIDAR unit 128, a camera 130, and/or a microphone 131. The sensor system 104 could also include sensors configured to monitor internal systems of the vehicle 100 (e.g., $O_2$ monitor, fuel gauge, engine oil temperature, wheel speed sensors, etc.). One or more of the sensors included in the sensor system 104 could be configured to be actuated separately and/or collectively in order to modify a position and/or an orientation of the one or more sensors.

The GPS 122 is a sensor configured to estimate a geographic location of the vehicle 100. To this end, the GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The RADAR unit 126 can represent a system that utilizes radio signals to sense objects within the local environment of the vehicle 100. In some embodiments, in addition to sensing the objects, the RADAR unit 126 and/or the computer system 112 can additionally be configured to sense the speed and/or heading of the objects.

Similarly, the laser rangefinder/LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of the vehicle 100 may be implemented to control the movement of the camera 130.

The sensor system 104 can also include a microphone 131. The microphone 131 can be configured to capture sound from the environment surrounding the vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, a throttle 134, a brake unit 136, a sensor fusion algorithm 138, a computer vision system 140, a navigation/pathing system 142, and/or an obstacle avoidance system 144, etc.

The steering unit 132 is operable to adjust the heading of the vehicle 100. For example, the steering unit 132 can adjust the axis (or axes) of one or more of the wheels/tires 121 so as to effect turning of the vehicle 100. The throttle 134 is configured to control, for instance, the operating speed of the engine/motor 118 and, in turn, adjust forward acceleration of the vehicle 100 via the transmission 120 and the wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding the vehicle 100 based on the data from the sensor system 104. In some embodiments, the assessments can include evaluations of individual objects and/or features in the environment surrounding the vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by the camera 130 to identify objects and/or features in the environment surrounding the vehicle 100. The detected features/objects can include traffic signals, roadway boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation/pathing system 142 is configured to determine a driving path for the vehicle 100. For example, the navigation/pathing system 142 can determine a series of speeds and directional headings to effect movement of the vehicle 100 along a path that substantially avoids perceived obstacles while generally advancing the vehicle 100 along a roadway-based path leading to an ultimate destination, which can be set according to user inputs via the user interface 116, for example. The navigation/pathing system 142 can additionally be configured to update the driving path dynamically while the vehicle 100 is in operation on the basis of perceived obstacles, traffic patterns, weather/road conditions, etc. In some embodiments, the navigation/pathing system 142 can be configured to incorporate data from the sensor fusion algorithm 138, the GPS 122, and one or more predetermined maps so as to determine the driving path for the vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle 100 by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle 100 that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of the vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from an occupant of the vehicle 100. Similarly, the speaker 152 can be configured to output audio to the occupant of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle 100 that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, the wireless communication system 146 can communicate with a wireless local area network (WLAN), for example, using WiFi. In some embodiments, the wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of the vehicle 100, such as electronics in the peripherals 108, the computer system 112, the sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and the energy source 119 can be implemented together, as in some all-electric cars.

Many or all of the functions of the vehicle 100 can be controlled via the computer system 112 that receives inputs from the sensor system 104, the peripherals 108, etc., and communicates appropriate control signals to the propulsion system 102, the control system 106, the peripherals 108, etc. to effect automatic operation of the vehicle 100 based on its surroundings. The computer system 112 includes at least one processor 113 (which can include at least one microprocessor) that executes instructions 115 stored in a non-transitory computer-readable medium, such as data storage 114. The computer system 112 may also represent a plurality of computing devices that serve to control individual components or subsystems of the vehicle 100 in a distributed fashion.

In some embodiments, the data storage 114 contains instructions 115 (e.g., program logic) executable by the processor 113 to execute various functions of the vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from, a user of the vehicle 100, such as an occupant in a passenger cabin of the vehicle 100. The user interface 116 can accordingly include one or more input/output devices within the peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of the vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in the data storage 114, and/or by other techniques.

Although the vehicle 100 is described and shown in FIG. 1 as having various components, e.g., the wireless communication system 146, the computer system 112, the data storage 114, and the user interface 116, integrated into the vehicle 100, one or more of these components can optionally be mounted or associated separately from the vehicle 100. For example, the data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up the vehicle 100 can generally be communicatively coupled together in a wired and/or wireless fashion.

Figure 2:
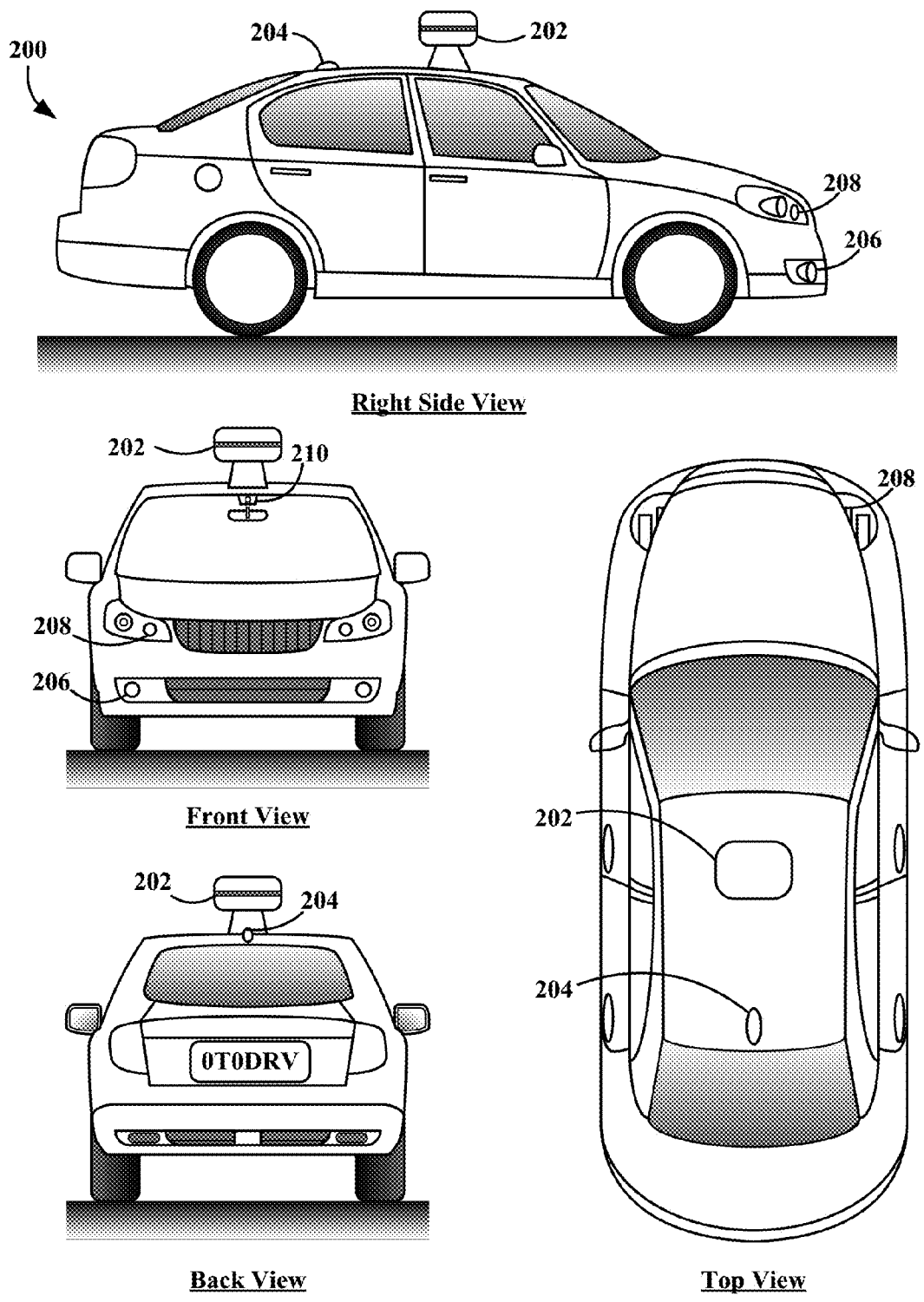
FIG. 2 depicts an example vehicle.

FIG. 2 depicts an example vehicle 200 that can include all or most of the functions described in connection with the vehicle 100 in reference to FIG. 1. Although example vehicle 200 is illustrated in FIG. 2 as a four-wheel sedan-type car for illustrative purposes, the present disclosure is not so limited. For instance, example vehicle 200 can represent any type of vehicle mentioned herein.

Example vehicle 200 includes a sensor unit 202, a wireless communication system 204, a LIDAR unit 206, a laser rangefinder unit 208, and a camera 210. Furthermore, example vehicle 200 can include any of the components described in connection with vehicle 100 of FIG. 1.

The sensor unit 202 is mounted atop example vehicle 200 and includes one or more sensors configured to detect information about an environment surrounding example vehicle 200, and output indications of the information. For example, the sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around example vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of the sensor unit 202 could be distributed in different locations and need not be collocated in a single location. Some possible sensor types and mounting locations include the LIDAR unit 206 and laser rangefinder unit 208. Furthermore, each sensor of the sensor unit 202 could be configured to be moved or scanned independently of other sensors of the sensor unit 202.

The wireless communication system 204 could be located on a roof of example vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to example vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 can be a photo-sensitive instrument, such as a still camera, a video camera, etc., that is configured to capture a plurality of images of the environment of example vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 can provide range information by using a structured light technique in which example vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, example vehicle 200 can determine the distance to the points on the object. The predetermined light pattern may comprise infrared light, or radiation at other suitable wavelengths for such measurements.

The camera 210 can be mounted inside a front windshield of example vehicle 200. Specifically, the camera 210 can be situated to capture images from a forward-looking view with respect to the orientation of example vehicle 200. Other mounting locations and viewing angles of the camera 210 can also be used, either inside or outside example vehicle 200.

The camera 210 can have associated optics operable to provide an adjustable field of view. Further, the camera 210 can be mounted to example vehicle 200 with a movable mount to vary a pointing angle of the camera 210, such as a via a pan/tilt mechanism.

Figure 3:
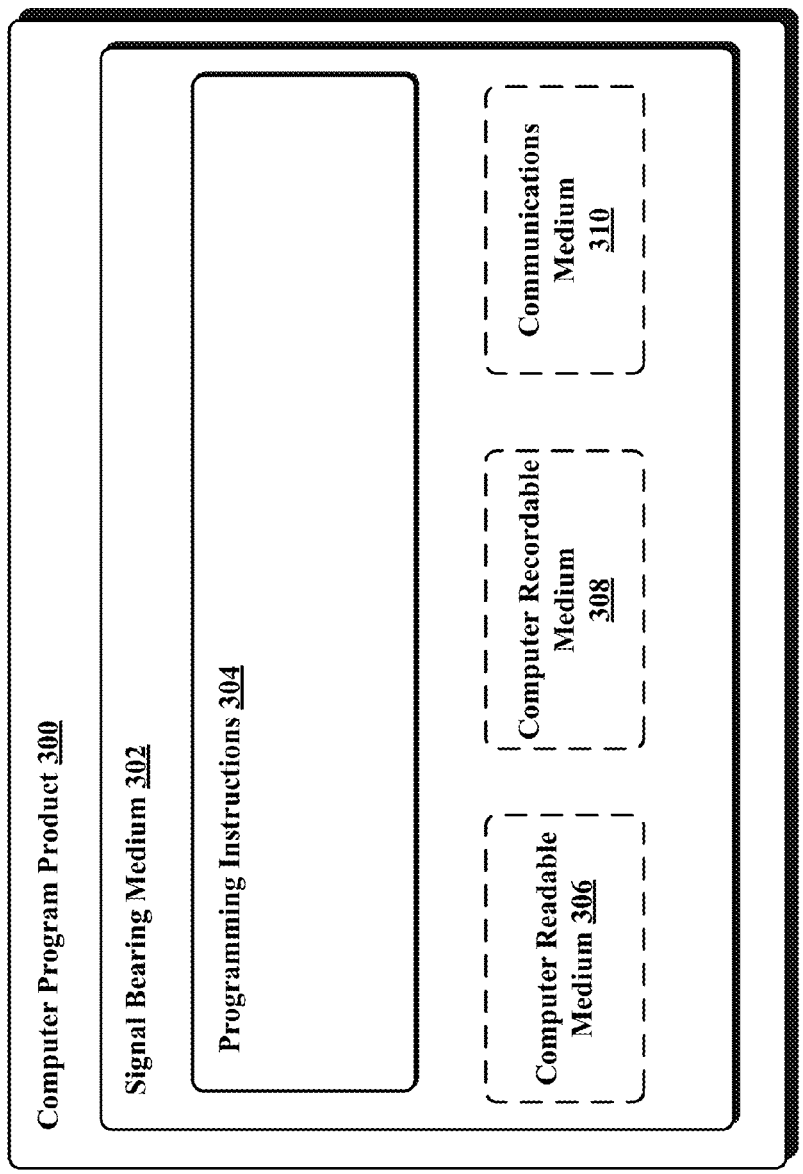
FIG. 3 depicts a computer-readable medium configured according to an example embodiment.

FIG. 3 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described herein.

In some embodiments, the techniques disclosed herein can be implemented by computer program instructions encoded on a non-transitory computer-readable storage media in a machine-readable format, or on other non-transitory media or articles of manufacture (e.g., the instructions 115 stored on the data storage 114 of the computer system 112 of the vehicle 100). FIG. 3 is a schematic illustrating a conceptual partial view of an example computer program product 300 that includes a computer program for executing a computer process on a computing device, arranged according to at least some embodiments presented herein.

In one embodiment, the example computer program product 300 is provided using a signal bearing medium 302. The signal bearing medium 302 may include one or more programming instructions 304 that, when executed by one or more processors may provide functionality or portions of the functionality described herein. In some examples, the signal bearing medium 302 can be a non-transitory computer-readable medium 306, such as, but not limited to, a hard disk drive, a Compact Disc (CD), a Digital Video Disk (DVD), a digital tape, memory, etc. In some implementations, the signal bearing medium 302 can be a computer recordable medium 308, such as, but not limited to, memory, read/write (R/W) CDs, R/W DVDs, etc. In some implementations, the signal bearing medium 302 can be a communications medium 310, such as, but not limited to, a digital and/or an analog communication medium (e.g., a fiber optic cable, a waveguide, a wired communications link, a wireless communication link, etc.). Thus, for example, the signal bearing medium 302 can be conveyed by a wireless form of the communications medium 310.

The one or more programming instructions 304 can be, for example, computer executable and/or logic implemented instructions. In some examples, a computing device such as the computer system 112 of FIG. 1 is configured to provide various operations, functions, or actions in response to the programming instructions 304 conveyed to the computer system 112 by one or more of the computer-readable medium 306, the computer-recordable medium 308, and/or the communications medium 310.

The non-transitory computer-readable medium could also be distributed among multiple data storage elements, which could be remotely located from each other. The computing device that executes some or all of the stored instructions could be a vehicle, such as example vehicle 200 illustrated in FIG. 2. Alternatively, the computing device that executes some or all of the stored instructions could be another computing device, such as a server.

Figure 4A:
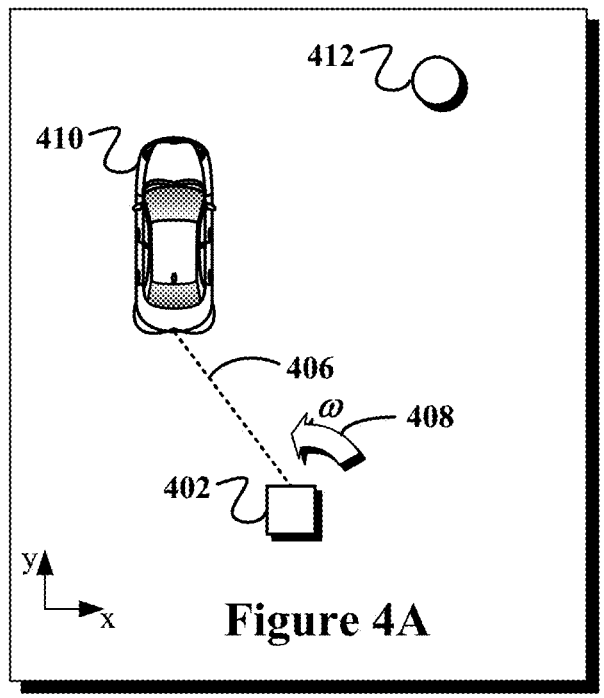
FIG. 4A schematically illustrates an example scenario of a LIDAR device scanning across an obstacle-filled environmental scene.

FIG. 4A schematically illustrates a LIDAR device 402 scanning across an obstacle-filled environmental scene. The example environment depicted in FIG. 4A includes a car 410 and a tree 412. In operation, the LIDAR device 402 rotates according to motion reference arrow 408 with angular velocity w. While rotating, the LIDAR device 402 regularly (e.g., periodically) emits laser beams, such as a laser beam 406. Reflections from the emitted laser beams by objects in the environment, such as the car 410 and the tree 412, are then received by suitable sensors. Precisely time-stamping the receipt of the reflected signals allows for associating each reflected signal (if any is received at all) with the most recently emitted laser pulse, and measuring the time delay between emission of the laser pulse and reception of the reflected light. The time delay provides an estimate of the distance to the reflective feature by scaling according to the speed of light in the intervening atmosphere. Combining the distance information for each reflected signal with the orientation of the LIDAR device 402 for the respective pulse emission allows for determining a position of the reflective feature in three-dimensions.

For illustrative purposes, the environmental scene in FIG. 4A is described in the two-dimensional x-y plane in connection with a single sweep of the LIDAR device 402 that estimates positions to a series of points located in the x-y plane. However, it is noted that a more complete three-dimensional sampling is provided by either adjusting beam steering optics (not shown) of the LIDAR device 402 to direct the laser beam 406 up or down from the x-y plane on its next sweep of the scene or by providing additional lasers and associated beam steering optics dedicated to sampling point locations in planes above and below the x-y plane shown in FIG. 4A, or combinations of these.

In some embodiments, the LIDAR device 402 can be configured to capture one or more laser point clouds of the environmental scene at predetermined time intervals, such as 100 milliseconds (for a refresh rate of 10 frames per second), 33 milliseconds (for a refresh rate of 30 frames per second), 1 millisecond, 1 second, etc.

In some embodiments, a single laser in the LIDAR device 402 can have a scanning range of approximately 150 meters distance, a thirty degree vertical ("altitude") field of view, and approximately a thirty degree horizontal ("azimuth") field of view. Additional lasers included in the LIDAR device 402 can have complementary ranges and fields of view as well so as to provide sufficient coverage of an environmental scene to inform navigational determinations.

Figure 4B:
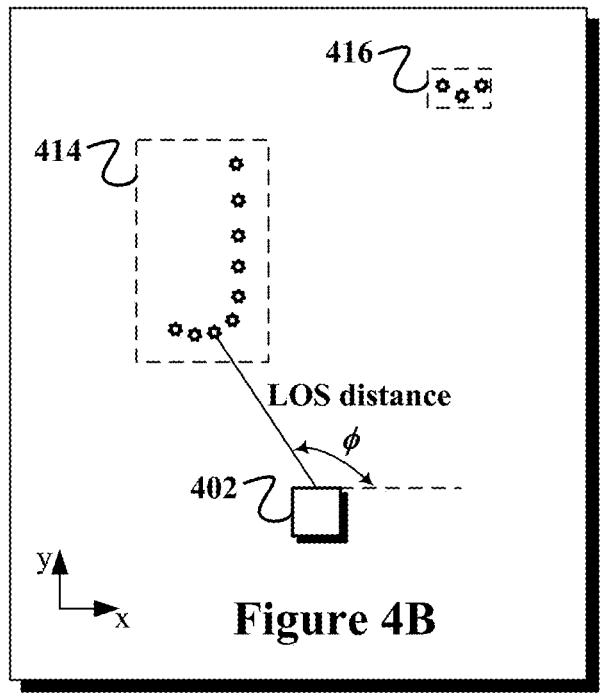
FIG. 4B schematically illustrates an example point cloud corresponding to the obstacle-filled environmental scene of FIG. 4A.

FIG. 4B schematically illustrates an example point cloud corresponding to the obstacle-filled environmental scene of FIG. 4A. Spatial-point data (represented by stars) are shown from a ground-plane (or aerial) perspective. Even though the individual points are not equally spatially distributed throughout the sampled environment, adjacent sampled points are roughly equally angularly spaced with respect to the LIDAR device 402. A car spatial data 414 correspond to measured points on the surface of the car 410 with a line of sight to the LIDAR device 402. Similarly, a tree spatial data 416 correspond to measured points on the surface of the tree 412 visible from the LIDAR device 402. The absence of points between the car spatial data 414 and the tree spatial data 416 indicates an absence of reflective features along the sampled line of sight paths in the plane illustrated. In some embodiments, point clouds may have as many as 50,000 laser-indicated points, 80,000 laser-indicated points, 100,000 laser-indicated points, etc.

Each point in the example point cloud illustrated in FIG. 4B can be referenced by an azimuth angle $\phi$ (e.g., orientation of the LIDAR device 402 while emitting the pulse corresponding to the point, which is determined by the orientation of a rotating angled mirror (not shown) of the LIDAR device 402 and a line-of-sight (LOS) distance (e.g., the distance indicated by the time delay between pulse emission and reflected light reception). For emitted pulses that do not receive a reflected signal, the LOS distance can optionally be set to the maximum distance sensitivity of the LIDAR device 402. The maximum distance sensitivity can be determined according to the maximum time delay the associated optical sensors wait for a return reflected signal following each pulse emission, which can itself be set according to the anticipated signal strength of a reflected signal at a particular distance given ambient lighting conditions, intensity of the emitted pulse, predicted reflectivity of environmental features, etc. In some examples, the maximum distance can be approximately 60 meters, 80 meters, 100 meters, or 150 meters, but other examples are possible for particular configurations of the LIDAR device 402 and associated optical sensors.

In some embodiments, the sensor fusion algorithm 138, the computer vision system 140, and/or the computer system 112, can interpret the car spatial data 414 alone and/or in combination with additional sensor-indicated information and/or memory-based pattern-matching point clouds and/or baseline maps of the environment to categorize or identify the group of points 414 as corresponding to the car 410. Similarly, the tree spatial data 416 can identified as corresponding to the tree 412 in accordance with a suitable object-detection technique.

In some embodiments, the data storage 114 of the computer system 112 of the vehicle 100 can store object-detector software, code, or other program instructions. Such object-detector software can include, or be part of, one or more of the subsystems of the control system 106 described above, including the sensor fusion algorithm 138, the computer vision system 140, and/or the obstacle avoidance system 144. An object detector may be any configuration of software and/or hardware configured to perceive features in the environmental scene by categorizing and/or identifying objects based on the laser point clouds captured by the laser rangefinder/LIDAR device 128 and/or based on one or more of the sensors in the sensor system 104. As a laser point cloud is captured via the laser rangefinder/LIDAR device 128, data indicative of the captured point cloud is communicated to the object detector, which analyzes the data to determine whether there is an object present in the laser point cloud. Objects indicated by the point cloud may be, for example, a vehicle (e.g., car 410) an obstacle (e.g., tree 412), a pedestrian, a road sign, a traffic light, a traffic cone, etc.

To determine whether an object is present in a laser point cloud image, the object-detector software and/or module can associate arrangements of laser-indicated points with patterns matching objects, environmental features, and/or categories of objects or features. The object detector can be pre-loaded (or dynamically instructed) to associate arrangements according to one or more parameters corresponding to physical objects/features in the environment surrounding the vehicle 100. For example, the object detector can be pre-loaded with information indicating a typical height of a pedestrian, a length of a typical automobile, confidence thresholds for classifying suspected objects, etc.

When the object detector identifies an object in a point cloud, the object detector can define a bounding box encompassing the object that. For example, the bounding box can correspond to a predicted exterior surface of the point cloud indicated object. Of course, the bounding "box" can generally take the form of a multi-sided closed shape defining the predicted outer boundaries of the object.

For each captured point cloud, positions of perceived objects and their corresponding boundary definitions are associated with a frame number or frame time. Thus, similarly shaped objects appearing in roughly similar locations in successive scans of the scene can be associated with one another to track objects in time. For perceived objects appearing in multiple point cloud frames (e.g., complete scans of the scanning zone), the object can be associated, for each frame on which the object appears, with a distinct bounding shape defining the dimensional extent of the perceived object.

To assist in providing object recognition, the vehicle 100 can also be in communication with an object-identification server (e.g., via the wireless communication system 146). The object-identification server can verify and/or classify objects detected by the vehicle 100 using the object detector. Moreover, the object-identification server can facilitate optimization of one or more of the parameters used by the object detector to detect objects in the captured laser point cloud based on accumulated data from other similar systems, local conditions. In one embodiment, the vehicle 100 can communicate the object boundaries, and their corresponding object parameters, to the object identification server for verification that the perceived objects are correctly identified, such as indicated by an evaluation for statistical likelihood of correct identification.

Further, as noted above, each spatial point can be associated with a respective laser from a set of lasers and a respective timestamp. That is, in an embodiment where the LIDAR device 402 includes multiple lasers, each respective received spatial point can be associated with the particular laser that was detected in accordance with the respective received spatial point. Additionally, each respective spatial point can be associated with a respective timestamp (e.g., a time at which the particular laser was emitted or received). In this way, the received spatial points may be organized, identified, or otherwise ordered on a spatial (laser identification) and/or temporal (timestamp) basis. Such an ordering may assist or improve an analysis of the spatial-point data by allowing for organizing the spatial-point data into a meaningful order.

Figure 4C:
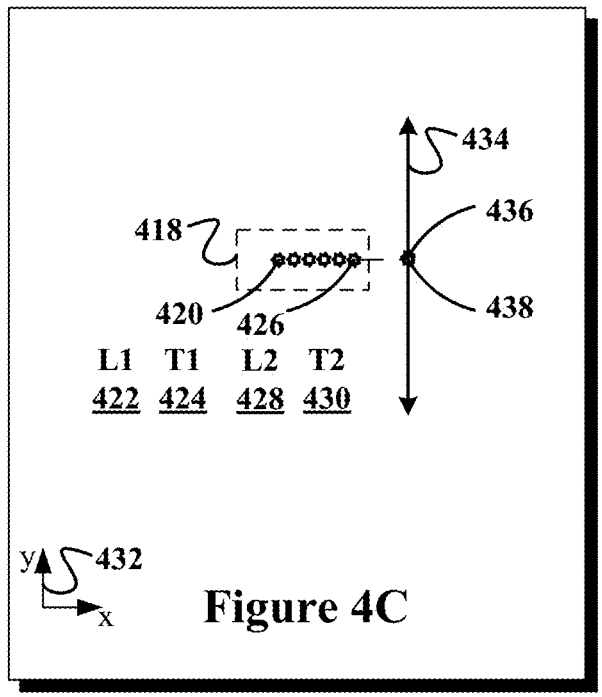
FIG. 4C schematically illustrates spatial point data indicative of a surface of a target vehicle that is stationary relative to the LIDAR device, according to an example embodiment.

FIG. 4C schematically illustrates spatial point data indicative of a surface of a target vehicle that is stationary relative to the LIDAR device, according to an example embodiment. In this example, a target surface 418 is identified from a set of spatial points indicative of locations of reflective surfaces received from the LIDAR device 402 by an objection-detection technique mentioned herein and/or any other known or later developed. In some embodiments, the set of spatial points is received from a single sweep of the LIDAR device 402. In some embodiments, the target surface 418 can be a front or rear surface of a target vehicle, such as the car 410.

In this example, a first point 420 and a second point 426 are also identified by an objection-detection technique mentioned herein and/or any other known or later developed. The first point 420 is indicative of a first location 422 on the target surface 418 obtained from the LIDAR device 402 at a first time 424, and the second point 426 is indicative of a second location 428 on the target surface 418 obtained from the LIDAR device 402 at a second time 430. Other points illustrated in FIG. 4C can be indicative of other locations on the target surface 418 obtained from the LIDAR device 402 at other times. With this arrangement, a speed of the target surface 418 is estimated based on the first location 422, the first time 424, the second location 428, and the second time 430.

In this example, the estimate of a speed of the target surface 418 is determined based on an offset between the first location 422 and the second location 428 divided by a time difference between the first time 424 and the second time 430.

As illustrated in FIG. 4C, a coordinate frame 432 includes a longitudinal axis 434. In this example, the target surface 418 is perpendicular to the longitudinal axis 434 to assist in estimating a speed of the target vehicle. In this example, a projected first point 436 is determined by projecting the first point 420 onto the longitudinal axis 434, and a second project point 438 is determined by projecting the second point 426 onto the longitudinal axis 434. With this arrangement, the offset between the first location 422 and the second location 428 is determined as a distance between the projected first point 436 and the projected second point 438.

In this example, the offset is zero because the projected first point 436 and the projected second point 438 are each at the same location on the longitudinal axis 434. Accordingly, the estimate of the speed of the target surface 418 in this example is zero.

In some embodiments, the coordinate frame 432 can include a fixed coordinate frame in an environment of the LIDAR device 402 based on data from an IMU associated with a vehicle. However, in some embodiments, the defining a coordinate frame can also be based at least in part on data from other sensors associated with the vehicle. For instance, the defining a coordinate frame can also be based at least in part on data from a GPS associated with the vehicle. Other examples are also possible.

In some embodiments, the longitudinal axis 434 can be defined based on a direction of motion of the LIDAR device 402 and/or a direction of motion of the target surface 418. In some examples, the direction of motion of the LIDAR device 402 is known. However, in other examples, the direction of motion of the LIDAR device 402 can be identified based on any technique mentioned herein and/or any other known or later developed. For instance, the direction of motion of the LIDAR device 402 can be identified based on a direction of a path, such as a roadway or a traffic lane, that the LIDAR device 402 is traveling. In some examples, the direction of motion of the target surface 418 is known. However, in other examples, the direction of motion of the target surface 418 can be identified based on any technique mentioned herein and/or any other known or later developed. For instance, the direction of motion of the target surface 418 can be identified based on a direction of a path, such as a roadway or a traffic lane, that the target surface 418 is traveling.

Figure 4D:
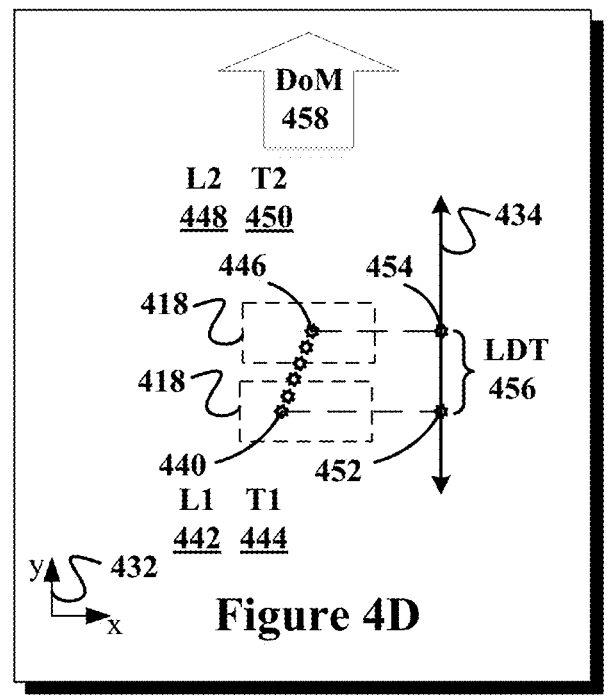
FIG. 4D schematically illustrates spatial point data indicative of a surface of a target vehicle that is moving relative to the LIDAR device, according to an example embodiment.

FIG. 4D schematically illustrates spatial point data indicative of a surface of a target vehicle that is moving relative to the LIDAR device, according to an example embodiment. In this example, the target surface 418 is identified from a set of spatial points indicative of locations of reflective surfaces received from the LIDAR device 402 by an objection-detection technique mentioned herein and/or any others known or later developed. In some embodiments, the set of spatial points is received from a single sweep of the LIDAR device 402.

In this example, a first point 440 and a second point 446 are also identified by an objection-detection technique mentioned herein and/or any others known or later developed. The first point 440 is indicative of a first location 442 on the target surface 418 obtained from the LIDAR device 402 at a first time 444, and the second point 446 is indicative of a second location 448 on the target surface 418 obtained from the LIDAR device 402 at a second time 450. Other points illustrated in FIG. 4D can be indicative of other locations on the target surface 418 obtained from the LIDAR device 402 at other times. In this example, the target surface 418 has a known direction of motion 458.

In this example, an estimate of a speed of the target surface 418 is determined based on an offset between the first location 442 and the second location 448 divided by a time difference between the first time 444 and the second time 450.

In this example, a projected first point 452 is determined by projecting the first point 440 onto the longitudinal axis 434, and a projected second point 454 is determined by projecting the second point 446 onto the longitudinal axis 434. With this arrangement, the offset between the first location 442 and the second location 448 is determined as a distance between the projected first point 452 and the projected second point 454.

In this example, the offset is greater than zero because the projected first point 452 and the projected second point 454 are separated by a distance on the longitudinal axis 434. Accordingly, the estimate of the speed of the target surface 418 in this example is greater than zero. As illustrated in FIG. 4D, the distance represents a longitudinal distance 456 traveled by the target surface 418.

Figure 5:
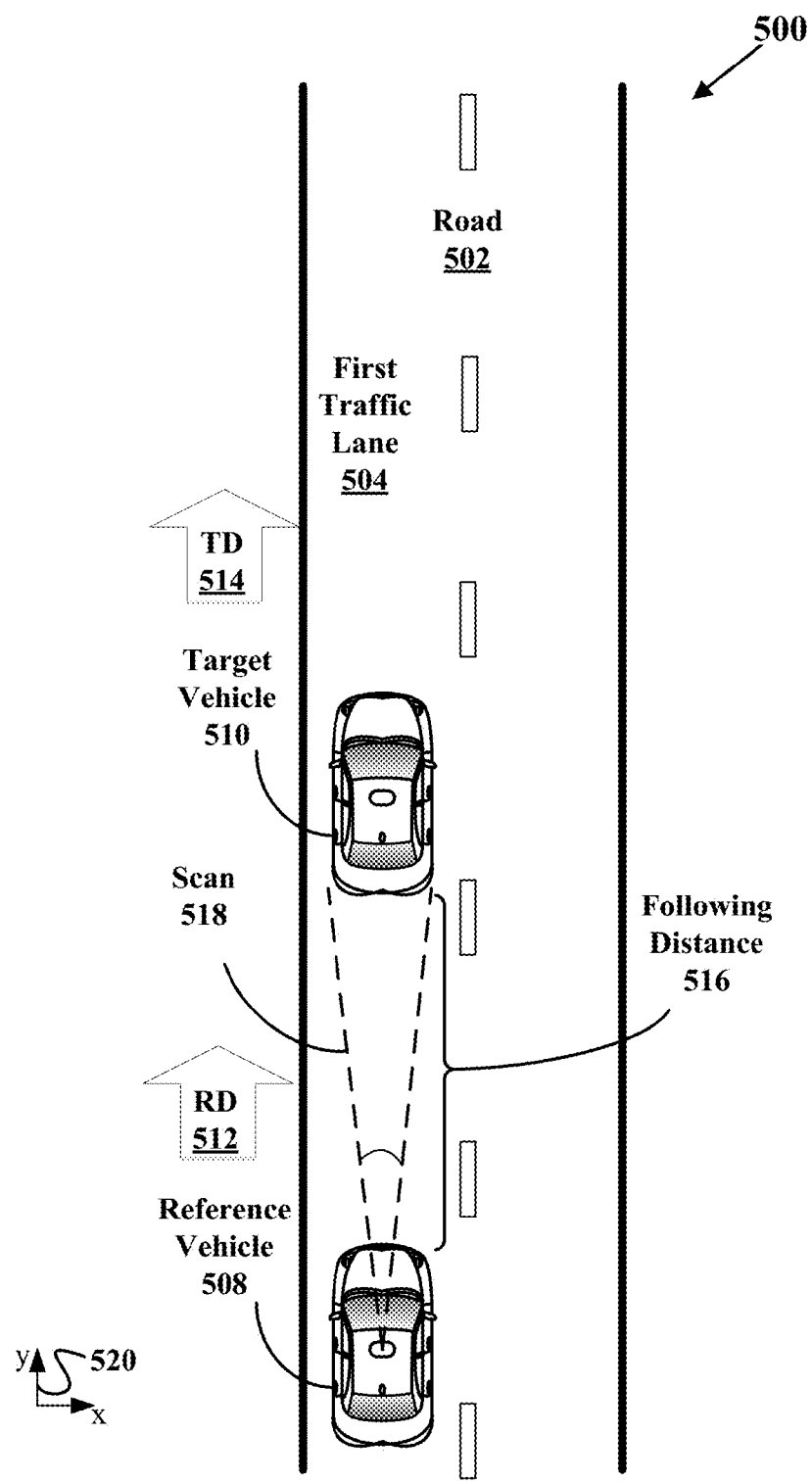
FIG. 5 depicts an example of an autonomous vehicle estimating vehicle speed according to an example embodiment.

FIG. 5 provides an example 500 of an autonomous vehicle estimating vehicle speed according to an example embodiment. In example 500, a reference vehicle 508 and a target vehicle 510 are each traveling in a first traffic lane 504 of a road 502.

As illustrated in example 500, the reference vehicle 508 is traveling in a reference direction 512 and the target vehicle 510 is traveling in a target direction 514. In example 500, the reference direction 512 is located in a two-dimensional plane, and the target 514 is located in the two-dimensional plane. In example 500, the target direction 514 is parallel to the reference direction 512.

As illustrated in example 500, the reference vehicle 508 is located a following distance 516 from the target vehicle 510. The following distance 516 can be a distance between portions of the reference vehicle 508 and the target vehicle 510 that are nearest each other. Alternatively, the following distance 516 may be a distance between a center point of the reference vehicle 508 and a center point of the target vehicle 510. Other examples of specifying the following distance 516 are possible as well.

In some embodiments, the reference vehicle 508 can be arranged like the vehicle 100 and/or example vehicle 200. In some embodiments, the target vehicle 510 can be arranged like the car 410, though in other embodiments the target vehicle 510 can be configured to operate in an autonomous mode.

In operation, the reference vehicle 508 estimates a speed of the target vehicle 510 according to at least one embodiment described herein based on a scan 518. In example 500, the speed of the target vehicle 510 is estimated relative to the road 502.

In example 500, the scan 518 is a single sweep of a LIDAR device associated with the reference vehicle 508. In example 500, the reference vehicle 508 projects two spatial points representative of a target surface of the target vehicle 510 onto a coordinate frame 520 to estimate the speed of the target vehicle 510 as described herein. The coordinate frame 520 can be arranged like the coordinate frame 432. In example 500, an estimate of a speed of the target vehicle 510 can be accurate even when the following distance 516 is large, such as 200 meters.

Figure 6:
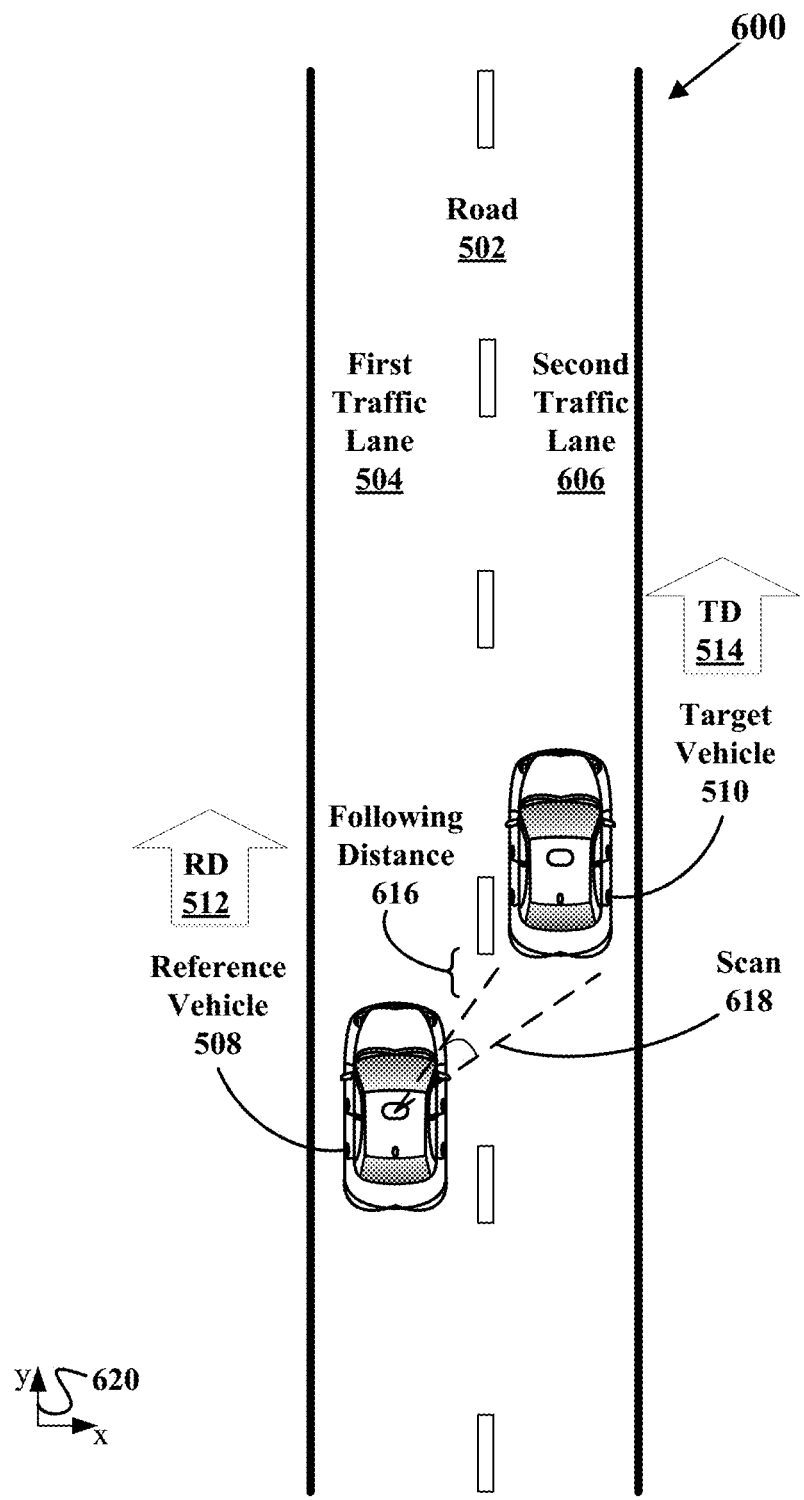
FIG. 6 depicts another example of an autonomous vehicle estimating vehicle speed according to an example embodiment.

FIG. 6 provides another example 600 of an autonomous vehicle estimating vehicle speed according to an example embodiment. In example 600, the reference vehicle 508 is traveling in the first traffic lane 504, and the target vehicle 510 is traveling in a second traffic lane 606 of the road 502. In example 600, the first traffic lane 504 is adjacent to the second traffic lane 606.

As illustrated in example 600, the reference vehicle 508 is traveling in the reference direction 512 and the target vehicle is traveling in the target direction 514.

As illustrated in example 600, the reference vehicle is located a following distance 616 from the target vehicle 510. The following distance 616 can be specified like the following distance 516.

In operation, the reference vehicle 508 estimates a speed of the target vehicle 510 according to at least one embodiment described herein based on a scan 618. In example 600, the speed of the target vehicle 510 is estimated relative to the road 502.

In example 600, the scan 618 is a single sweep of a LIDAR device associated with the reference vehicle 508. In example 600, the reference vehicle 508 projects two spatial points representative of a target surface of the target vehicle 510 onto a coordinate frame 620 to estimate the speed of the target vehicle 510 as described herein. The coordinate frame 620 can be arranged like the coordinate frame 432.

Figure 7:
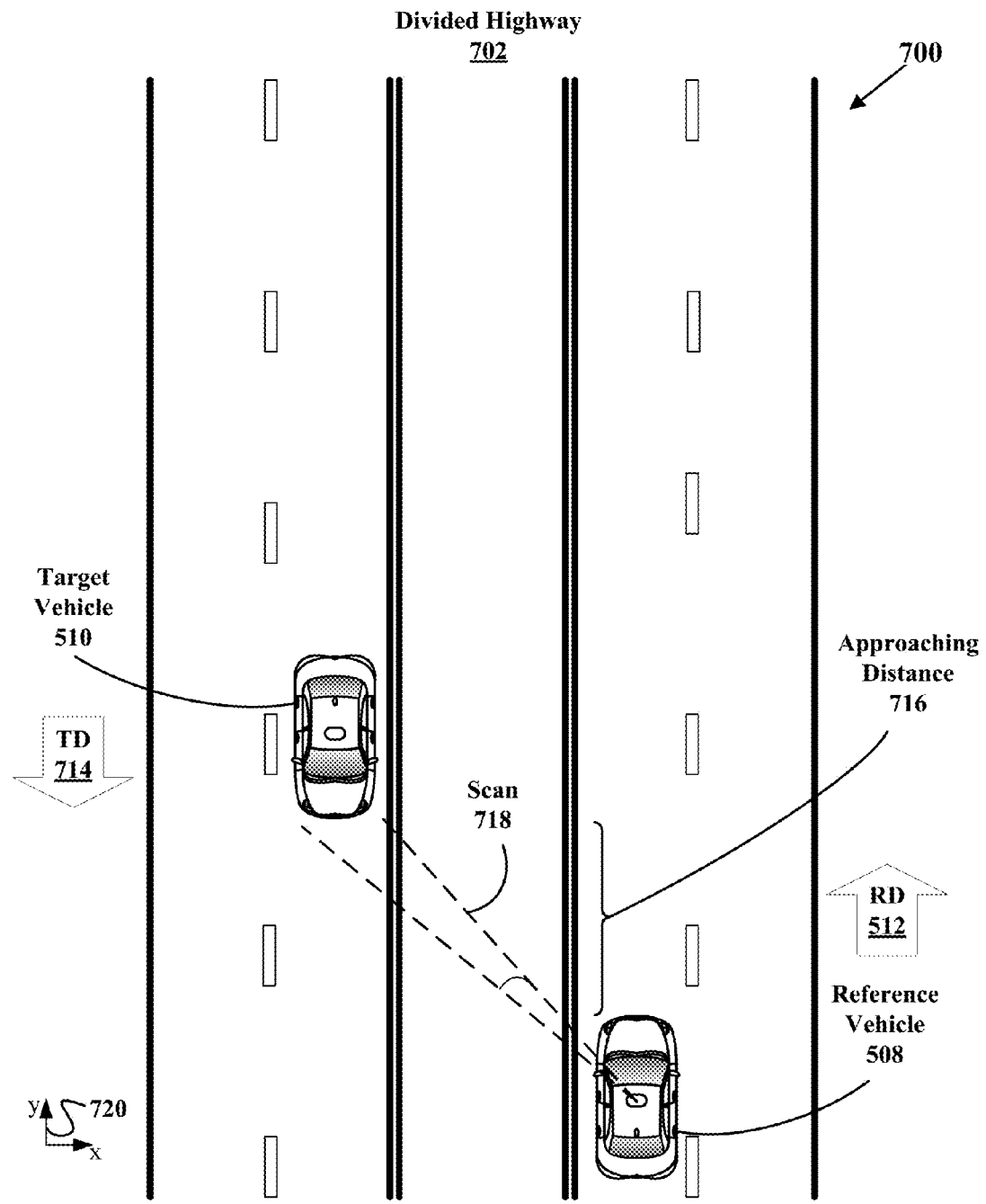
FIG. 7 depicts yet another example of an autonomous vehicle estimating vehicle speed according to an example embodiment.

FIG. 7 provides yet another example 700 of an autonomous vehicle estimating vehicle speed according to an example embodiment. In example 700, the reference vehicle 508 and the target vehicle 510 are each traveling on a divided highway 702.

As illustrated in example 700, the reference vehicle 508 is traveling in the reference direction 512 and the target vehicle 510 is traveling in a target direction 714. In example 700, the reference direction 512 is located in a two-dimensional plane, and the target direction 714 is located in the two-dimensional plane. In example 700, the target direction 714 is opposite to the reference direction 512.

As illustrated in example 700, the reference vehicle 508 is located an approaching distance 716 from the target vehicle 510. The approaching distance 716 can be specified like the following distance 516.

In operation, the reference vehicle 508 estimates a speed of the target vehicle 510 according to at least one embodiment described herein based on a scan 718. In example 700, the speed of the target vehicle 510 is estimated relative to the divided highway 702.

In example 700, the scan 718 is a single sweep of a LIDAR device associated with the reference vehicle 508. In example 700, the reference vehicle 508 projects two spatial points representative of a target surface of the target vehicle 510 onto a coordinate frame 720 to estimate the speed of the target vehicle 510 as described herein. The coordinate frame 720 can be arranged like the coordinate frame 432. In example 700, an estimate of a speed of the target vehicle 510 can be accurate even when the approaching distance 716 is large, such as 200 meters.

The estimate of a speed of a target vehicle, such as the target vehicle 510, may be used by a reference vehicle, such as the reference vehicle 508, in a variety of situations. As one example, one or more components of the reference vehicle may use the estimate of the speed of the target vehicle to respond to the target vehicle being stopped and/or otherwise traveling slowly in certain circumstances, such as a traffic jam. As another example, one or more components of the reference vehicle may use the estimate of the speed of the target vehicle to respond to the target vehicle merging into a traffic lane. In accordance with these or other examples, one or more components of the reference vehicle can respond to the target vehicle by changing a heading of the reference vehicle, reducing a speed of the reference vehicle, etc.

Figure 8:
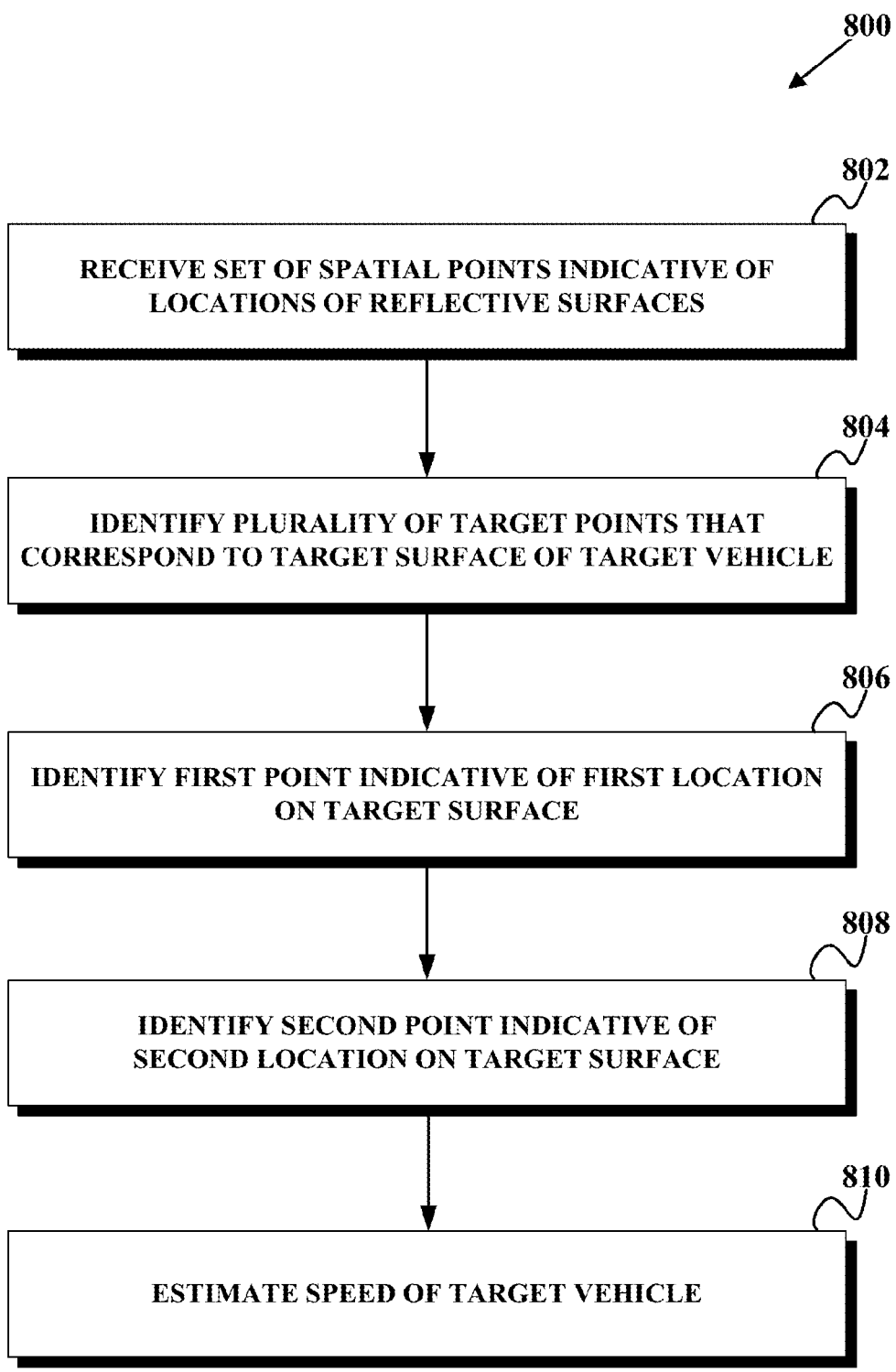
FIG. 8 is a flowchart of a method for estimating vehicle speed according to an example embodiment.
Figure 9:
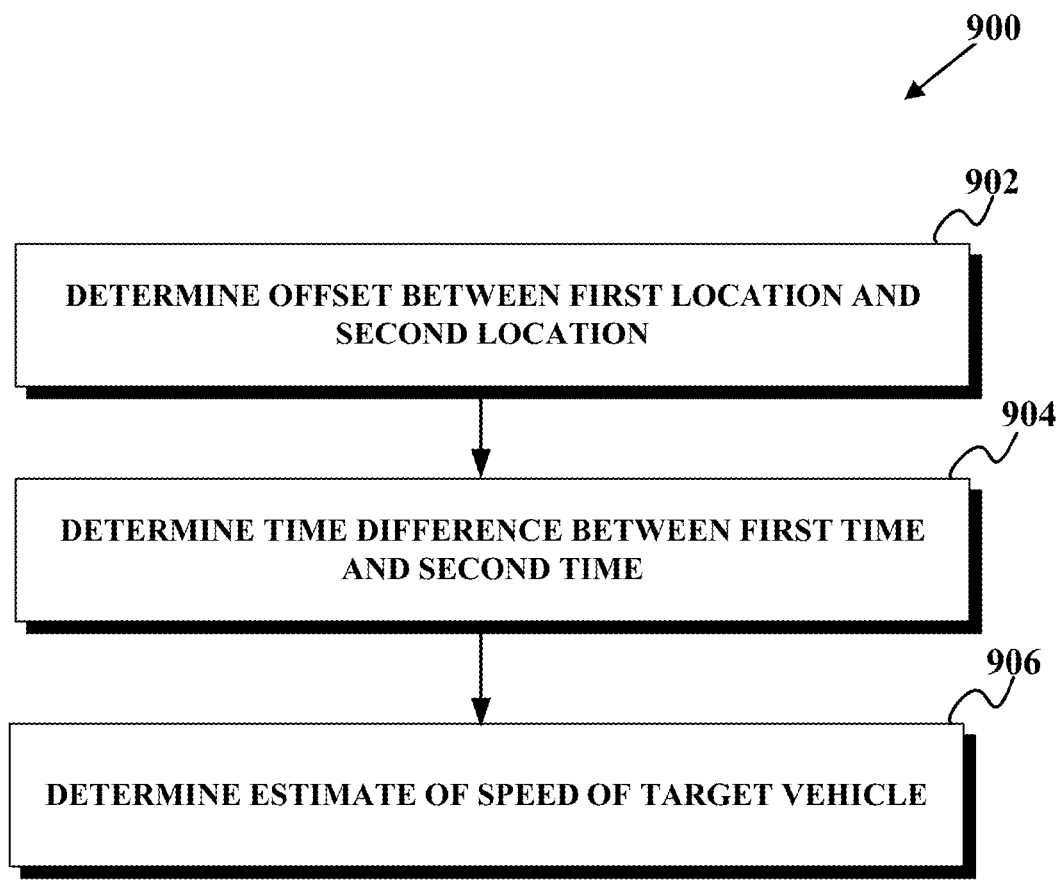
FIG. 9 is a flowchart of a method for estimating a speed of a target vehicle based on a first location obtained at a first time and a second location obtained at a second time, according to an example embodiment.
Figure 10:
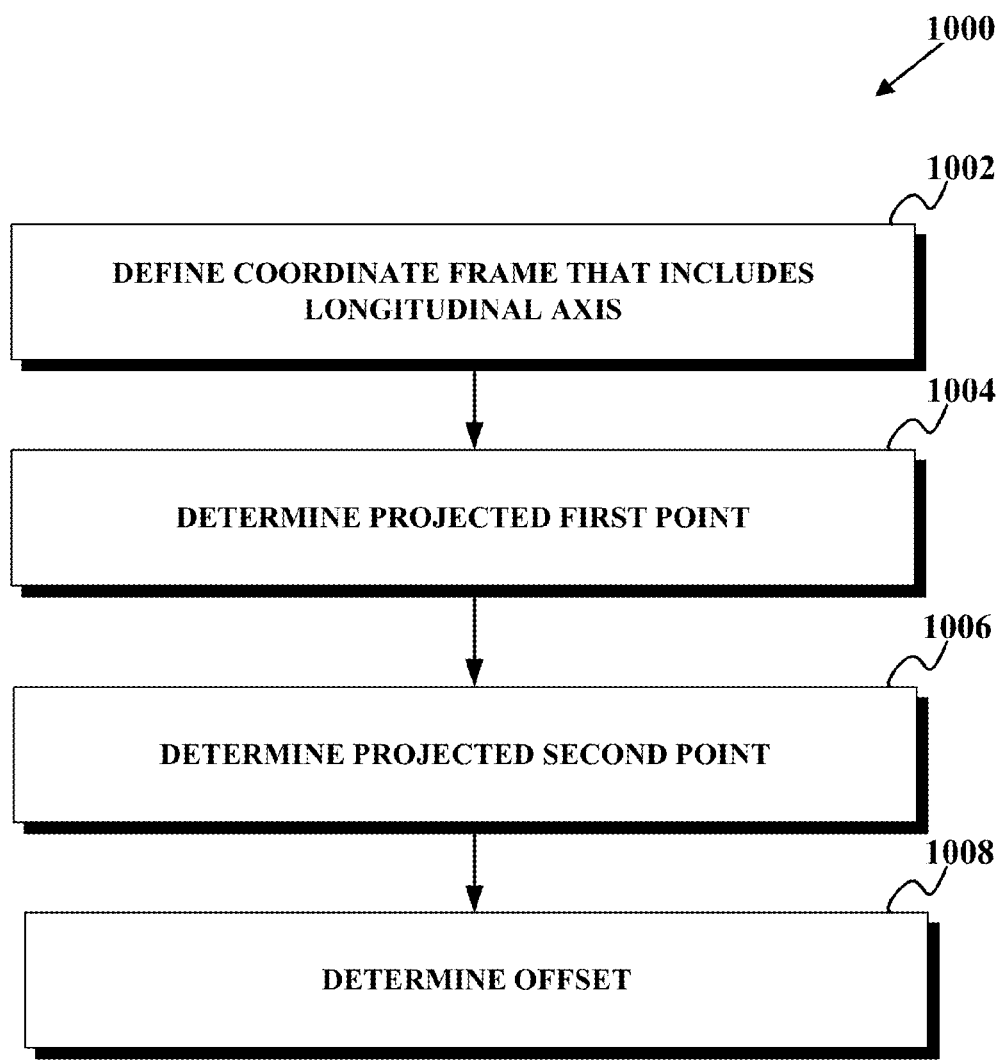
FIG. 10 is a flowchart of an example method for determining an offset between the first location and the second location of the method of FIG. 9.

FIGS. 8-10 each present flowcharts describing processes employed separately or in combination in some embodiments of the present disclosure. The methods described herein are generally described by way of example as being carried out by an autonomous vehicle, such as vehicles 100, 200 described above in connection with FIGS. 1 and 2. For example, the processes described herein can be carried out by the laser rangefinder/LIDAR unit 128 and associated optical sensors (e.g., the sensor unit 202) mounted to an autonomous vehicle (e.g., example vehicle 200) in communication with the computer system 112, the sensor fusion algorithm 138, and/or the computer vision system 140.

Furthermore, it is noted that the functionality described in connection with the flowcharts described herein can be implemented as special-function and/or configured general-function hardware modules, portions of program code executed by a processor (e.g., the processor 113 in the computer system 112) for achieving specific logical functions, determinations, and/or steps described in connection with the flowchart shown in FIG. 8. Where used, program code can be stored on any type of computer-readable medium (e.g., computer-readable storage medium or non-transitory media, such as the data storage 114 described above with respect to the computer system 112 and/or the computer program product 300), for example, such as a storage device including a disk or hard drive. In addition, each block of the flowchart shown in FIG. 8 can represent circuitry that is wired to perform the specific logical functions in the process. Unless specifically indicated, functions in the flowchart shown in FIG. 8 can be executed out of order from that shown or discussed, including substantially concurrent execution of separately described functions, or even in reverse order in some examples, depending on the functionality involved, so long as the overall functionality of the described method is maintained. Furthermore, similar combinations of hardware and/or software elements can be employed to implement the methods described in connection with other flowcharts provided in the present disclosure, such as the additional flowcharts shown in FIGS. 9 and 10.

FIG. 8 is a flowchart 800 of a method for estimating vehicle speed, according to an example embodiment. Flowchart 800 begins with receiving a set of spatial points obtained using a LIDAR device associated with a vehicle, wherein the spatial points are indicative of locations of reflective surfaces in an environment of the vehicle (802). In some embodiments, the LIDAR device can be arranged like the LIDAR device 402 and/or the laser rangefinder/LIDAR unit 128. In some embodiments, the set of spatial points can be received from a single sweep of the LIDAR the device, such as the scan 518, the scan 618, and/or the scan 718.

Flowchart 800 continues with identifying in the set of spatial points a plurality of target points that correspond to a target surface of a target vehicle, wherein the target surface is a front or a rear surface of the target vehicle (804). In some embodiments, the target vehicle can be arranged like the target vehicle 508. In some embodiments, the target surface can be arranged like the target surface 418.

Flowchart 800 continues with identifying, in the plurality of target points, a first point indicative of a first location on the target surface, wherein the first point was obtained by the LIDAR device at a first time (806). In some embodiments, the first point can be arranged like the first point 420, the first location can be arranged like the first location 422, and/or the first time can be arranged like the first time 424.

Flowchart 800 continues with identifying, in the plurality of target points, a second point indicative of a second location on the target surface, wherein the second point was obtained by the LIDAR device at a second time (808). In some embodiments, the second point may be arranged like the second point 426, the second location can be arranged like the second location 428, and the second time can be arranged like the second time 430.

Flowchart 800 continues with estimating, by a computing device, a speed of the target vehicle based on the first location, the first time, the second location, and the second time (810). In some embodiments, the computing device can be arranged like the computer system 112.

FIG. 9 is a flowchart 900 of a method for the estimating a speed of a target vehicle based on a first location obtained at a first time and a second location obtained at a second time. Flowchart 900 begins with determining an offset between the first location and the second location (902).

Flowchart 900 continues with determining a time difference between the first time and the second time (904).

Flowchart 900 continues with determining an estimate of the speed of the target vehicle based on the offset divided by the time difference (906).

FIG. 10 is a flowchart 1000 of an example method for determining an offset between the first location and the second location of the method of FIG. 9. Flowchart 1000 begins with defining a coordinate frame that includes a longitudinal axis (1002). In some embodiments, the defining a coordinate frame can include defining a fixed coordinate frame in an environment of a vehicle based on data from an IMU associated with the vehicle, such as the IMU 124. However, in some embodiments, the defining a coordinate frame can also be based at least in part on data from other sensors associated with the vehicle. For instance, the defining a coordinate frame can also be based at least in part on data from a GPS, such as the GPS 122. Other examples are also possible.

Flowchart 1000 continues with determining a projected first point by projecting the first point onto the longitudinal axis (1004).

Flowchart 1000 continues with determining a projected second point by projecting the second point onto the longitudinal axis (1006).

Flowchart 1000 continues with determining the offset as a distance between the projected first point and the projected second point on the longitudinal axis (1008).

In some embodiments, a target direction of a target vehicle, such as the target direction 514 and/or the target direction 714 of the target vehicle 510, can be at an angle to a reference direction of a reference vehicle, such as the reference direction 512 of the reference vehicle 508. As one example, the target direction can be at an angle to the reference direction when the target vehicle and the reference vehicle are each traveling on a path, such as the road 502 and/or the divided highway 702, that is curved. As another example, the target direction can be at an angle to the reference direction when reference vehicle and/or the target vehicle is changing lanes in a roadway, such as merging into a traffic lane. With this arrangement, the flowchart 1000 can further comprise removing rotation between the first point and the second point.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:

1. A method comprising:
receiving a set of spatial points obtained using a light detection and ranging (LIDAR) device associated with a vehicle, wherein the spatial points are indicative of locations of reflective surfaces in an environment of the vehicle;
identifying in the set of spatial points a plurality of target points that correspond to a target surface of a target vehicle, wherein the target surface is a front surface or a rear surface of the target vehicle;
identifying, in the plurality of target points, a first point indicative of a first location on the target surface, wherein the first point was obtained by the LIDAR device at a first time;
identifying, in the plurality of target points, a second point indicative of a second location on the target surface, wherein the second point was obtained by the LIDAR device at a second time;
determining an offset between the first location and the second location, wherein determining the offset between the first location and the second location comprises:
defining a coordinate frame that includes a longitudinal axis, wherein the longitudinal axis is defined based on a direction of motion of the LIDAR device;
determining a projected first point by projecting the first point onto the longitudinal axis;
determining a projected second point by projecting the second point onto the longitudinal axis; and
determining the offset as a distance between the projected first point and the projected second point on the longitudinal axis;
determining a time difference between the first time and the second time; and
determining, by a computing device, an estimate of a speed of the target vehicle based on the offset divided by the time difference and the direction of motion of the LIDAR device.

2. The method of claim 1, wherein the defining a coordinate frame comprises defining a fixed coordinate frame in the environment based on data from an inertial measurement unit (IMU) associated with the vehicle.

3. The method of claim 1, wherein the defining a coordinate frame comprises defining a fixed coordinate frame in the environment based at least in part on data from a global positioning system (GPS) associated with the vehicle.

4. The method of claim 1, wherein the vehicle is configured to operate in an autonomous mode.

5. The method of claim 1, wherein the vehicle travels in a reference direction located in a two-dimensional plane, and wherein the target vehicle travels in a target direction located in the two-dimensional plane.

6. The method of claim 5, wherein the target direction is parallel to the reference direction.

7. The method of claim 6, wherein the target direction is opposite the reference direction.

8. The method of claim 1, wherein the vehicle travels in a traffic lane, and wherein the target vehicle travels in the traffic lane.

9. The method of claim 1, wherein the vehicle travels in a first traffic lane, and wherein the target vehicle travels in a second traffic lane, wherein the first traffic lane is adjacent to the second traffic lane.

10. A system comprising:
a light detection and ranging (LIDAR) device;
a processing unit;
non-transitory data storage; and
program instructions stored in the non-transitory data storage and executable by the processing unit to carry out functions comprising:
receiving a set of spatial points obtained using the LIDAR device, wherein the spatial points are indicative of locations of reflective surfaces in an environment of the LIDAR device;
identifying in the set of spatial points a plurality of target points that correspond to a target surface of a target vehicle, wherein the target surface is a front surface or a rear surface of the target vehicle;
identifying, in the plurality of target points, a first point indicative of a first location on the target surface, wherein the first point was obtained by the LIDAR device at a first time;
identifying, in the plurality of target points, a second point indicative of a second location on the target surface, wherein the second point was obtained by the LIDAR device at a second time;
determining an offset between the first location and the second location, wherein determining the offset between the first location and the second location comprises:
defining a coordinate frame that includes a longitudinal axis, wherein the longitudinal axis is defined based on a direction of motion of the LIDAR device;
determining a projected first point by projecting the first point onto the longitudinal axis;
determining a projected second point by projecting the second point onto the longitudinal axis; and
determining the offset as a distance between the projected first point and the projected second point on the longitudinal axis;
determining a time difference between the first time and the second time; and
determining an estimate of a speed of the target vehicle based on the offset divided by the time difference and the direction of motion of the LIDAR device.

11. The system of claim 10, wherein the defining a coordinate frame comprises defining a fixed coordinate frame in the environment based on data from an inertial measurement unit (IMU) associated with the LIDAR device.

12. The system of claim 10, wherein the defining a coordinate frame comprises defining a fixed coordinate frame in the environment based at least in part on data from a global positioning system (GPS) associated with the LIDAR device.

13. The system of claim 10, wherein the LIDAR device is associated with a vehicle.

14. The system of claim 13, wherein the vehicle is configured to operate in an autonomous mode.

15. A non-transitory computer-readable medium having program instructions stored therein executable by a computing device to cause the computing device to perform functions comprising:
receiving, via a processor of the computing device, a set of spatial points obtained using a light detection and ranging (LIDAR) device, wherein the spatial points are indicative of locations of reflective surfaces in an environment of the LIDAR device;
identifying in the set of spatial points a plurality of target points that correspond to a target surface of a target vehicle, wherein the target surface is a front surface or a rear surface of the target vehicle;

identifying, in the plurality of target points, a first point indicative of a first location on the target surface, wherein the first point was obtained by the LIDAR device at a first time;
identifying, in the plurality of target points, a second point indicative of a second location on the target surface, wherein the second point was obtained by the LIDAR device at a second time;
determining an offset between the first location and the second location, wherein determining the offset between the first location and the second location comprises:
 defining a coordinate frame that includes a longitudinal axis, wherein the longitudinal axis is defined based on a direction of motion of the LIDAR device;
 determining a projected first point by projecting the first point onto the longitudinal axis;
 determining a projected second point by projecting the second point onto the longitudinal axis; and
 determining the offset as a distance between the projected first point and the projected second point on the longitudinal axis;
determining a time difference between the first time and the second time; and
determining an estimate of a speed of the target vehicle based on the offset divided by the time difference and the direction of motion of the LIDAR device.

16. The non-transitory computer-readable medium of claim 15, wherein the defining a coordinate frame comprises defining a fixed coordinate frame in the environment based on data from an inertial measurement unit (IMU) associated with the LIDAR device.

17. The non-transitory computer-readable medium of claim 15, wherein the defining a coordinate frame comprises defining a fixed coordinate frame in the environment based at least in part on data from a global positioning system (GPS) associated with the LIDAR device.

* * * * *